US008385354B2

(12) United States Patent
Nukala

(10) Patent No.: US 8,385,354 B2
(45) Date of Patent: Feb. 26, 2013

(54) SCALABLE HARDWARE MECHANISM TO IMPLEMENT TIME OUTS FOR PENDING POP REQUESTS TO BLOCKING WORK QUEUES

(75) Inventor: Lakshmi Narasimha Murthy Nukala, Pleasanton, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 6 days.

(21) Appl. No.: 13/185,454

(22) Filed: Jul. 18, 2011

(65) Prior Publication Data

US 2013/0024864 A1   Jan. 24, 2013

(51) Int. Cl.
*H04L 12/28* (2006.01)
*H04L 12/56* (2006.01)

(52) U.S. Cl. ............... 370/395.7; 719/314; 711/167; 718/102

(58) Field of Classification Search .......... 370/412; 719/314; 718/102; 711/167–169
See application file for complete search history.

(56) References Cited

U.S. PATENT DOCUMENTS

| 7,016,996 | B1 * | 3/2006 | Schober | 710/113 |
|---|---|---|---|---|
| 7,506,218 | B2 * | 3/2009 | Gilgen et al. | 714/55 |
| 2002/0078252 | A1 * | 6/2002 | Fields et al. | 709/314 |
| 2012/0020368 | A1 * | 1/2012 | Sundararaman et al. | 370/412 |
| 2012/0051367 | A1 * | 3/2012 | Amagai et al. | 370/412 |

* cited by examiner

*Primary Examiner* — Diem Cao
(74) *Attorney, Agent, or Firm* — Blakely Sokoloff Taylor & Zafman, LLP

(57) ABSTRACT

Methods and apparatus for minimizing resources for handling time-outs of read requests to a work queue in a work queue memory are described. According to one embodiment of the invention, a work queue execution engine receives a first read request when the work queue is configured in a blocking mode and is empty. A time-out timer is started in response to receiving the first read request. The work queue execution engine receives a second read request while the first read request is still pending, and the work queue is still empty. When the time-out timer expires for the first read request, the work queue execution engine sends an error response for the first read request and restarts the time-out timer for the second read request taking into account an amount of time the second read request has already been pending.

20 Claims, 8 Drawing Sheets

SCALABLE HARDWARE MECHANISM TO IMPLEMENT TIME OUTS FOR PENDING POP REQUESTS TO BLOCKING WORK QUEUES

FIELD

Embodiments of the invention relate to the field of multi-processing systems, and more specifically, to a method and apparatus to implement time outs for pending read request in work queues of a multi-threaded processor.

BACKGROUND

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). In typical network elements such as routers or switches, a network processor performs the packet switching and routing functions between a physical layer portion of a network and a switch fabric of the network element. Some of these functions include packet forwarding, packet classification, network address translation, and packet encryption. Such routers and switches generally include multiple network processors in an array of multiple line cards and control cards with at least one network processor associated with each card. As consumers continue to demand more bandwidth to satisfy their growing multimedia needs, in order to keep up with the processing power needed to process the increase in network traffic flowing through these network elements, modern network processor architecture employs multiple processing execution cores operating in a multi-threaded environment to take advantage of performance gains through workload parallelism.

Within a multithreaded network processor, packet data is typically distributed and stored temporarily in multiple work queues until the packet data is needed for processing by one of the threads executing in one of the execution cores. Work queues are hardware implemented First-In-First-Out storage elements (FIFOs). When data is written into a work queue, this write operation is also known as a PUSH operation. When packet data is needed for processing, the source of the request, which is the execution core that is processing the particular execution thread requiring the packet data, fetches that data from the work queue. Such read request to a work queue is also known as a POP request.

During normal operation, it is possible for a read request to be issued to an empty work queue. Conditions that may result in a read request being issued to an empty work queue include network data throughput variations due to unsteady network traffic or traffic interruptions, reconfigurations of the network, or other network conditions that may cause temporary starvation of the work queues. When an empty work queue receives a read request, if the work queue is configured in a non-blocking mode, a fail value is returned to the source of the read request immediately. The source of the read request would then terminate the read request and poll for the required data at a later time. As a result, additional system resources and higher power consumption may be required to perform these subsequent read polling operations.

To avoid this read polling mechanism and the additional resources that are needed by the read polling mechanism to handle read requests to an empty work queue configured in a non-blocking mode, a work queue can be configured in a blocking mode instead. When a work queue is operating in a blocking mode, a read request to an empty work queue is not returned until data is written into the work queue to complete the read request. While this mode of operation avoids the read polling mechanism described above, if another execution thread whose task is to write to that empty work queue becomes unresponsive, then the source of the read request would wait and stall indefinitely. As the number of execution threads in a network processor increases to accommodate the increase in network traffic, the number of potentially stalled threads scales along with the number of execution threads. This can lead to thousands to millions of stalled threads and dramatically hinder the performance of a network processor resulting in dropped traffic and prolonged network interruptions.

SUMMARY

Methods and apparatus to minimize resources for handling time-outs of read requests to a work queue configured in a blocking mode in a work queue memory used by a threaded execution unit in the multi-threaded processing system are described. According to one embodiment, a work queue execution engine module (WQEE) receives a first read request to the work queue when the work queue is empty. The request information associated with the first read request is stored in a status memory in the WQEE, and a time-out timer is started in response to receiving the first read request. The WQEE receives a second read request to the work queue while the first read request is still pending and the work queue is still empty. Request information associated with the second read request is stored in the work queue memory. When the time-out timer expires for the first read request, responsive to this event, an error response is sent for the first read request, and the time-out timer is restarted for the second read request taking into account an amount of time the second read request has already been pending.

According to another embodiment, a multithreaded network processor is configured to minimize resources required to handle time-outs of read requests to work queues. The multithreaded network processor includes a plurality of threaded execution cluster modules (TECs) each having a plurality of threaded execution units (TEUs) to execute processing threads in the network processor. The multithreaded network processor also includes an on-chip network (OCN) switch module coupled to the plurality of TECs to manage communication for the plurality of TEUs. In addition, the multithreaded network processor also includes a plurality of work queue execution engine modules (WQEEs) coupled to the plurality of TEUs for managing read and write accesses from the plurality of TEUs to a plurality of work queue groups. Each of the WQEEs is coupled to one of the work queue groups in a work queue memory. Each of the WQEEs includes only one time-out timer, for each work queue in the corresponding work queue group, to generate time-outs of pending read requests to the corresponding work queue when the time-out timer expires. Each of the WQEEs also includes a status memory to store, for each work queue in the corresponding work queue group, request information associated with an oldest one of the pending read requests to the corresponding work queue. In addition, each of the WQEEs also includes a work queue interface logic block to perform the read and write accesses to the corresponding work queue group, and, responsive to the time-out timer expiring for the oldest one of the pending read requests, to send an error response and to restart the time-out timer for the next pending read request taking into account an amount of time that next pending read request has already been pending.

According to a further embodiment, a line card in a network element for interfacing with an external network includes at least one multithreaded network processor configured to minimize resources required to handle time-outs of read requests to work queues. At least one of the multithreaded network processors includes a plurality of threaded execution cluster modules (TECs) each having a plurality of threaded execution units (TEUs) to execute processing threads in the network processor. That multithreaded network processor also includes an on-chip network (OCN) switch module coupled to the plurality of TECs to manage communication for the plurality of TEUs. In addition, that multithreaded network processor also includes a plurality of work queue execution engine modules (WQEEs) coupled to the plurality of TEUs for managing read and write accesses from the plurality of TEUs to a plurality of work queue groups. Each of the WQEEs is coupled to one of the work queue groups in a work queue memory. Each of the WQEEs includes only one time-out timer, for each work queue in the corresponding work queue group, to generate time-outs of pending read requests to the corresponding work queue when the time-out timer expires. Each of the WQEEs also includes a status memory to store, for each work queue in the corresponding work queue group, request information associated with an oldest one of the pending read requests to the corresponding work queue. In addition, each of the WQEEs also includes a work queue interface logic block to perform the read and write accesses to the corresponding work queue group, and, responsive to the time-out timer expiring for the oldest one of the pending read requests, to send an error response and to restart the time-out timer for the next pending read request taking into account an amount of time that next pending read request has already been pending.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
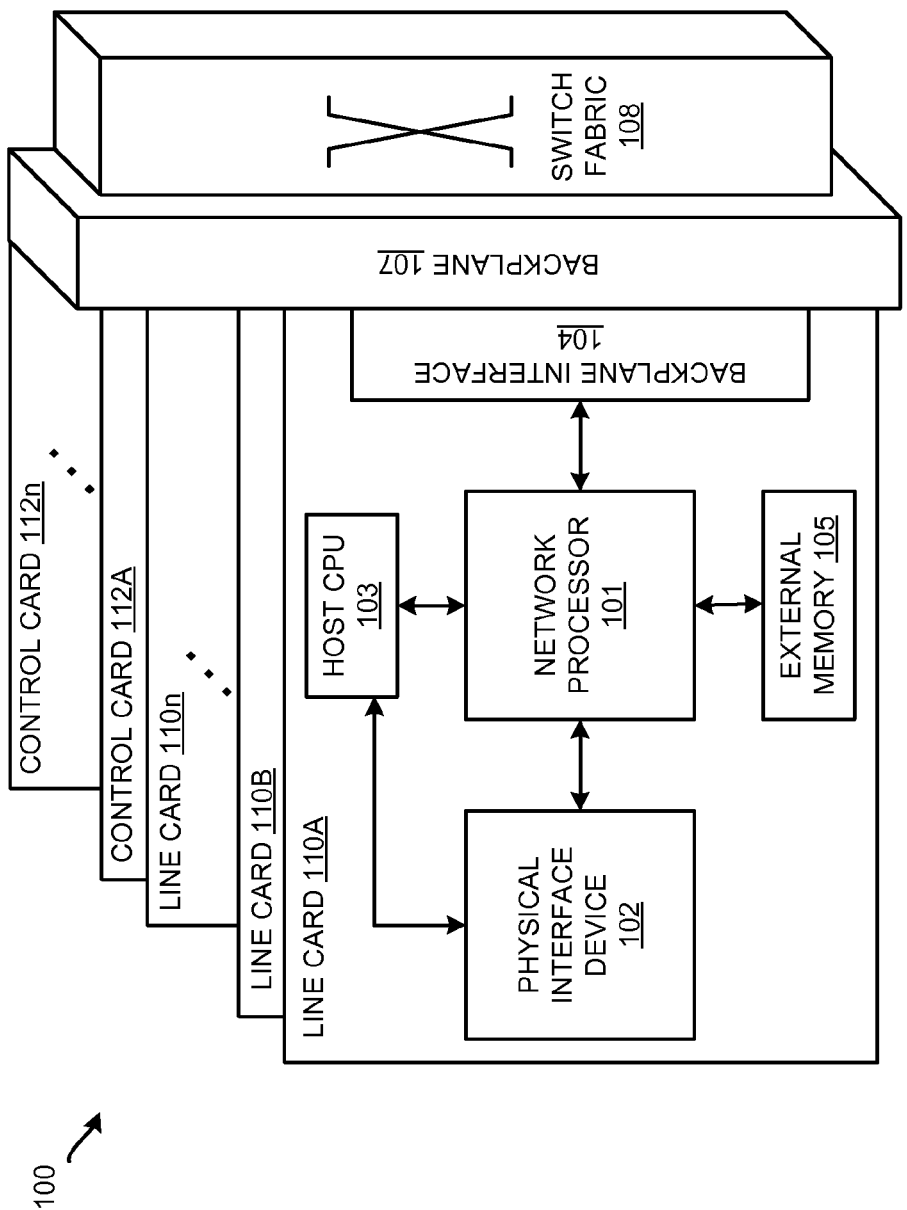
FIG. 1 illustrates a network element according to one embodiment of the invention.

The following description describes methods and apparatus for a scalable hardware mechanism to implement time outs for pending read requests to work queues. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

In accordance to one embodiment of the present invention, FIG. 1 illustrates an exemplary network element 100. Network element 100 may be a router, a switch, or any network element that includes one or more line cards 110 and one or more control cards 112. The number of line cards and control cards illustrated is for the sake of simplicity and not by way of limitation, as a lesser or greater number of line cards can be included within network element 100. Additionally, network element 100 includes a backplane 107 coupled to a switch fabric 108. Backplane 107 couples the one or more line cards 110 and the one or more control cards 112 to the switch fabric 108. The switch fabric 108 provides inter-connectivity between the lines cards 110 to allow data from any one of the line cards 110 to be sent to any other one of the line cards 110.

Each of the line cards 110 in network element 100 is configured to interface with an external network through physical interface device 102 such as a framer or a mapper device. In one embodiment, each of the line cards 110 of network element 100 is coupled to optical lines through physical interface device 102 transmitting SONET OC-N signals. Optical transceivers (not shown) are used to convert electrical signals from the physical interface device 102 into optical signals for transmission onto the optical lines and vice versa. Physical interface device 102 may also include one or more serializer/deserializer (SerDes) to convert data between serial and parallel interfaces. In another embodiment, line cards 110 of network element 100 may be coupled to electrical lines such as a T1, T3, E1, E3, Ethernet, Gigabit Ethernet, etc. through physical interface device 102. However, embodiments of the present invention are not limited to the above-described examples, as any other type of optical or electrical data transmission can be incorporated into embodiments of the present invention. Furthermore, each of the line cards 110 within network element 100 may be coupled to a different type of optical/electrical lines independent from the type of optical/electrical lines that are coupled to other line cards within network element 100.

Each of the line cards 110 includes at least one multithreaded network processor 101 coupled to the physical device 102. External memory 105 is coupled to the multithreaded network processor 101 to expand the memory storage capacity of the multithreaded network processor 101. A backplane interface 104 is coupled to the multithreaded network processor 101 to provide connectivity to the backplane 107. Additionally, each of the line cards may include a host CPU 103 for initialization and/or configuration of the physical device 102 and/or the multithreaded network processor 101.

Figure 2:
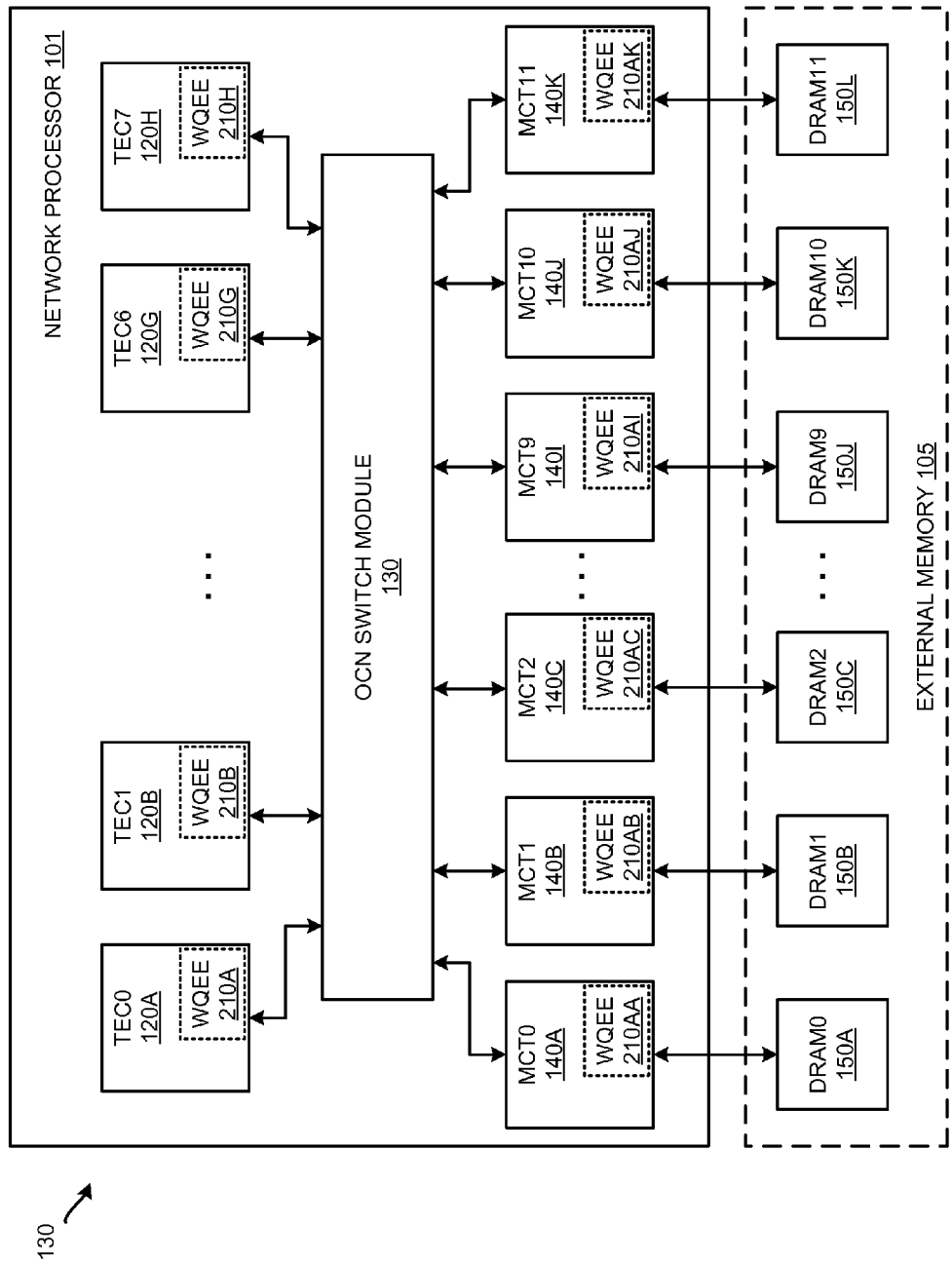
FIG. 2 illustrates a multithreaded processing system according to one embodiment of the invention.

FIG. 2 illustrates a block diagram of a multithreaded processing system 130 portion of line card 110A according to one embodiment of the invention. The multithreaded processing system 130 includes a multithreaded network processor 101. The multithreaded network processor 101 includes a plurality of threaded execution cluster modules (TECs) 120 coupled to an on-chip network (OCN) switch module 130. By way of example, the multithreaded network processor 101 is shown to have eight TECs 120. However, it should be understood that the multithreaded network processor 101 may have any number of TECs 120.

Figure 3:
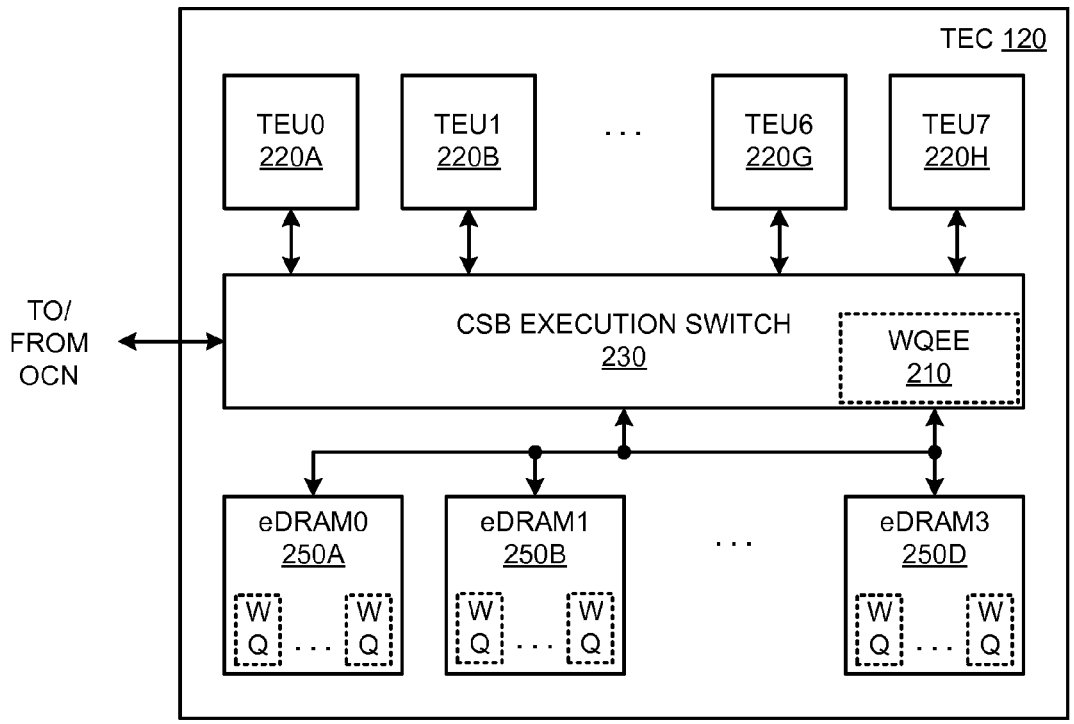
FIG. 3 illustrates a threaded execution cluster module according to one embodiment of the invention.

An exemplary embodiment of a TEC 120 in accordance with the present invention is shown in FIG. 3. Within each TEC 120 is a plurality of threaded execution units (TEUs) 220 configured to execute processing threads in the multithreaded network processor 101. The plurality of TEUs 220 are coupled a cluster switch block (CSB) module 230, which is configured to distribute workload among the TEUs 220. The CSB 230 also provides communication and interconnectivity between the TEUs 220 in the TEC 120 to the OCN switch module 130. The CSB 230 includes a work queue execution engine (WQEE) 210 coupled to the plurality of TEUs 220 to manage read and write accesses from the TEUs 220 to a plurality of work queue groups in the work queue memory. In this exemplary embodiment, the work queue groups in the TEC 120 are implemented with on-chip embedded memory such as embedded DRAM (eDRAM) 250, and hence on-chip work queues make up the work queue groups that are inside TEC 120. In another embodiment, other memory types may be used to implement the work queue memory. Although TEC 120 is shown to have eight TEUs 220 and four eDRAM modules 250, it should be understood that TEC 120 may include any number of TEUs 220 and any number of eDRAM 250 or other memory modules.

Referring back to FIG. 2, the OCN switch module 130 is coupled to the plurality of TECs 120 to manage communication between the TEUs 220. The OCN switch module 130 also provides connectivity between the TEUs 220 to a plurality of memory controllers (MCT) 140 that are configured to interface with off-chip external memory 105. In one embodiment of the multithreaded processing system 130, external memory 105 is used to extend the storage capacity of the system beyond the memory storage capacity within the multithreaded network processor 101. Each MCT 140 is coupled to the OCN switch module 130 and to one or more external memory modules 150 that are part of the off-chip external memory 105. By way of example, external memory 105 includes twelve DRAM modules 150 coupled to twelve MCTs 140. In another embodiment, external memory 105 may be implemented with different types of memory such as SRAM or Flash and may include a lesser or greater number of memory modules. In addition, any number of MCTs 140 may be included in an alternative embodiment, and each MCT 140 may be coupled to one or more memory modules.

Figure 4:
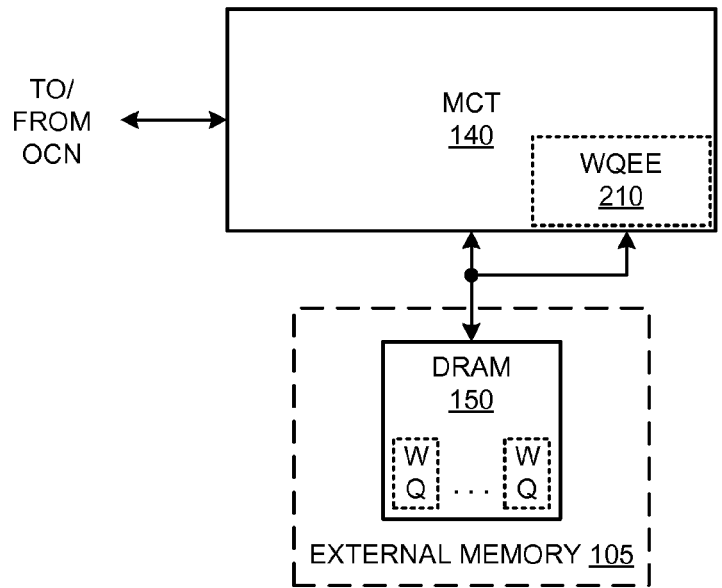
FIG. 4 illustrates a memory controller according to one embodiment of the invention.

FIG. 4 illustrates one embodiment of a MCT 140 in accordance with the present invention. MCT 140 includes a WQEE 210 coupled to a work queue group implemented in external memory 105. The WQEE 210 manages read and write accesses from the TEUs 220 to the work queue groups in the external memory 105. The work queue groups coupled to the MCT 140 are implemented with off-chip memory such as DRAM 150, and hence off-chip work queues make up the work queue groups that are coupled to MCT 140.

Referring back to FIG. 2, while the multithreaded processing system 130 is shown to include external memory 105, in other embodiments, it is not necessary to have external memory 105 in the multithreaded processing system 130. For example, one embodiment of the multithreaded network processor 101 may provide sufficient internal on-chip embedded memory storage capacity such that off-chip external memory is not needed. In such an embodiment, the multithreaded processing system 130 includes only on-chip work queue groups, and in an example implementation of such an embodiment, the multithreaded network processor 101 may have no MCT 140, or MCT 140 may have no WQEE 210. In an alternative embodiment, the multithreaded processing system 130 may include only off-chip work queue groups such that on-chip embedded memory can be reserved for other purposes.

Figure 5:
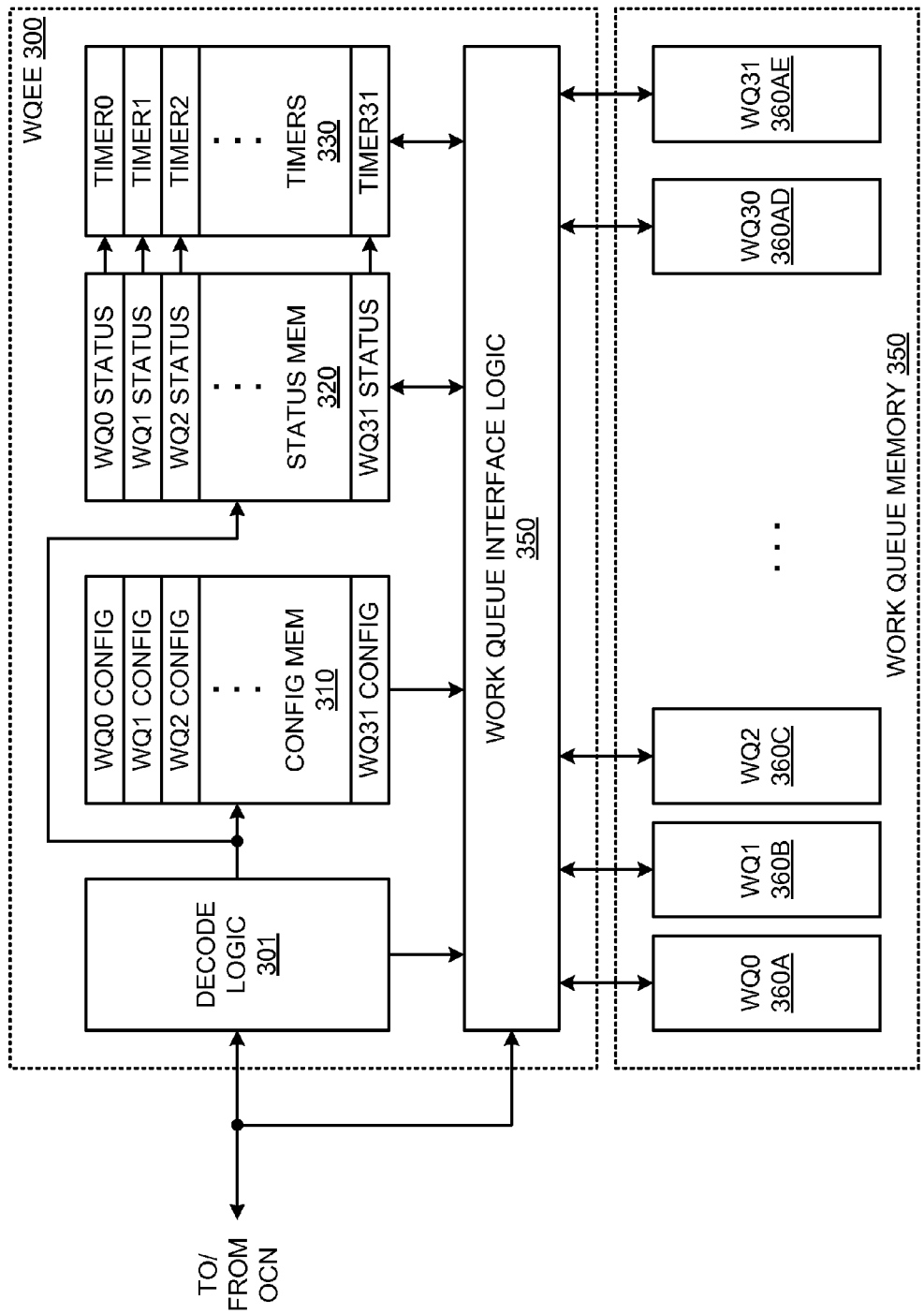
FIG. 5 illustrates a work queue execution engine according to one embodiment of the invention.

FIG. 5 illustrates one embodiment of a WQEE 300 in accordance with the present invention. Each WQEE 300 is configured to manage a work queue group. By way of example, WQEE 300 is shown to manage a work queue group having thirty-two work queues 360. In other embodiments, any number of work queues can be managed by one WQEE 300. In one embodiment, for example, where the WQEE 300 is implemented inside a CSB 230, the work queues 360 in work queue memory 350 is implemented with on-chip embedded memory such as eDRAM. In another embodiment, for example, where the WQEE 300 is implemented inside a MCT 140, the work queues 360 in work queue memory 350 is implemented with off-chip external memory such as external DRAM modules.

WQEE 300 includes a decode logic block 301, a configuration memory 310, a status memory 320, and a work queue interface logic block 350. Each work queue 360 has a corresponding work queue configuration register implemented in the configuration memory 310, and a corresponding work queue status register implemented in the status memory 320. Decode logic block 301 is coupled to the OCN switch module 130 to perform address decoding/translation and to decode work queue related instructions. Work queue related instructions include instructions to read or write to the work queue group, or to read or write to one of the configuration or status registers associated with the work queue group. Instructions may be sent to the WQEE 300 from a local TEU 220 within the TEC 120 that includes the WQEE 300, or instructions may be sent from any of the TEUs 200 within the multithreaded network processor 101 across the OCN switch module 130. The work queues 360 are coupled to the work queue interface logic block 350, which is coupled to the OCN switch module 130 and the other blocks of the WQEE 300. The work queue interface logic block 350 receives the decoded instructions from the decode logic block 301, and performs read and write accesses to the work queues 360 in the work queue group, configuration of the configuration memory 310, and updates of the status memory 320.

Configuration memory 310 includes configuration registers to store configuration information for each work queue such as, for example, whether the work queue is valid, the entry size of the work queue, the depth of the work queue, and whether the work queue is configured in a blocking or non-blocking mode for read requests. Status memory 320 includes status registers to store status information about each work queue such as, for example, an empty status to indicate the work queue is empty, and a full status to indicate the work queue is full. While the configuration memory 310 and the status memory 320 are shown to be implemented in the WQEE 300, in an alternative embodiment, the configuration memory 310 and the status memory 320 may be implemented in the work queue memory 350.

By way of example, if each WQEE 300 in the exemplary embodiment of the multithreaded processing system 130 in FIG. 2 manages thirty-two work queues as shown in FIG. 5, then in the exemplary multithreaded processing system 130, which has a total of twenty WQEEs 300, there are 32×20=640 work queues. If all work queues are configured in a blocking mode and all work queues are empty, and if each work queue is 64 k entries deep, then there can be up to 640×64 k=40 k pending read requests in the multithreaded processing system 130. Furthermore, if each TEC 120 can execute up to 128 threads, then there can be up to 8×128=1,024 execution threads or read request sources to the work queues, and thus, up to 1,024 potentially stalled threads in the multithreaded processing system 130.

In one embodiment of the multithreaded processing system 130, a software mechanism is used to handle the time out of these pending read requests to prevent the threads from stalling indefinitely. The software mechanism runs a background thread to periodically monitor read request sources that are waiting on empty work queues and to take corrective action after a predetermined time-out time has elapsed. In the exemplary embodiment described above, this would require the monitoring of potentially over one thousand threads that are stuck in the stalled state due to the pending read requests to empty work queues. Using this software monitoring mechanism can add to the execution latency and hinder the performance of the overall system because of the additional processing resources needed to run the background thread. While the negative impact on software performance due to the monitoring mechanism may be negligible for monitoring over one thousand potentially stalled threads, the negative impact scales directly with the number of threads in the multithreaded processing system 130. In other embodiments where the number of threads may be in the range of tens to hundreds of thousands, the impact of the monitoring mechanism on the software performance may be significant.

In another embodiment of the multithreaded processing system 130, each of the entries in each of the work queues has its own corresponding time-out counter (not shown). When the time-out counter expires, the work queue interface logic block 350 generates an error response to the read request source to terminate the outstanding read request. As discussed above, in the exemplary multithreaded processing system 130, there can be up to 40 k pending read requests. Implementing 40 k time-out counters in hardware can have a signification impact on the size and power dissipation of the multithreaded network processor 101. In other embodiments with deeper work queues or a great number of work queues, it may not be feasible to add the additional hardware time-out counters to support each additional work queue entry.

In an exemplary embodiment of the multithreaded network processor 101, in order to minimize the resources needed for handling time-outs of read requests to a work queue 360 in the work queue memory 350 being used by a TEU 220 in the multi-threaded processing system 130, instead of having one time-out counter per work queue entry, the multithreaded network processor 101 has only one time-out timer for each work queue 360 in the corresponding work queue group, to generate time-outs of pending read requests to the corresponding work queue when the time-out timer expires. As shown in FIG. 5, each work queue 360 has one corresponding timer 330 in the timers block in the WQEE 300. In this exemplary embodiment, the status memory 320 is configured to store, for each work queue 360 in the corresponding work queue group, request information associated with an oldest one of the pending read requests to the corresponding work queue 360. In addition to the status information that are stored in the status memory 320 described above, request information associated with an oldest one of the pending read requests including the source of that oldest read request, the destination of the data for that oldest read request, and a time stamp corresponding to that oldest read request are also stored in the status memory 320 in the WQEE 300. Request information of subsequent read requests including the sources of those subsequent read requests, the destinations of the data for those subsequent read requests, and the time stamps corresponding to those subsequent read requests to the corresponding work queue 360 are stored within the work queue memory 350.

Each time-out timer 330 is set to expire when the oldest pending read request to its corresponding work queue 360 has been pending for a predetermined period of time. When the time-out timer 330 corresponding to a work queue 360 expires, responsive to that time-out timer 330 expiring for the oldest one of the pending read requests, the work queue interface logic block 350 sends an error response to the source of that oldest pending read request and restarts the time-out timer 330 for the next one of the pending read requests taking into account an amount of time that next one of the pending read requests has already been pending. In order to restart the time-out timer 330 for the next one of the pending read requests, the work queue interface logic block 350 fetches the request information associated with that next one of the pending read requests from the work queue memory 350. This request information includes the time-stamp corresponding to that next one of the pending read requests to indicate the system time when that next one of the pending read requests was received. The time-out timer 330 is then restarted using the time-stamp corresponding to the next one of the pending read requests to determine an amount of time to set for the time-out timer 330.

In one embodiment, the time-out timer 330 includes a counter, and the time-out timer 330 is configured to expire when the counter reaches a time-out value. This time-out value corresponds to a predetermined time-out time. In one embodiment, the time-out value is the predetermined time-out time divided by the period of the system clock. In this embodiment, the counter in the time-out timer 330 increments at each system clock, and the time-stamp for each pending read request is the system time represented by the value of a system tick counter that increments at every system clock when the read request was received. When the oldest pending read request to a corresponding work queue 360 expires after the predetermined time-out time has lapsed for that oldest pending read request when the counter in the time-out timer 330 reaches the time-out value, the counter in the time-out timer 330 is restarted with a starting value being the result of subtracting the time-stamp from the system time when the time-out timer expires.

In an alternative embodiment, the time-out value is a scaled version of the predetermined time-out time divided by the period of the system clock. For example, the time-out value may be the predetermined time-out time divided by the period of the system clock further divided by 100. In this embodiment, the counter in the time-out timer 330 increments once every 100 system clocks, and the time-stamp for each pending read request is represented by the value of a system tick counter divided by 100 when the read request was received. When the oldest pending read request to a corresponding work queue 360 expires after the predetermined time-out time has lapsed for that oldest pending read request when the counter in the time-out timer 330 reaches the time-out value, the counter in the time-out timer 330 is restarted with a starting value being the result of subtracting the time-stamp from the system time represented by the value of the system tick counter divided by 100 when the time-out timer expires. In these embodiments described above, each time-out timer 330 can be implemented with a counter and a subtractor.

In a further embodiment, the time-out timer 330 is configured to expire when a system time reaches a sum of the time-stamp stored in the status memory 320 of the corresponding work queue 360 and a time-out value. Similar to the above embodiments, the time-stamp and the system time can be represented by the value of the system tick counter or a scaled version of the system tick counter, and the time-out value can be the predetermined time-out time divided by the period of the system clock or a scaled version. In this further embodiment, each time-out timer 330 can be implemented with a comparator and an adder. The adder is used to add the time-stamp to the time-out value, and the comparator is configured to generate a time-out indication to indicate the time-out timer 330 expiring when the system time is equal to the result of the adder. When the oldest pending read request to a corresponding work queue 360 expires after the predetermined time-out time has lapsed for that oldest pending read request, the time-stamp corresponding to the next one of the pending read requests is fetched from the work queue memory 350, and the time-stamp stored in the status memory 320 is updated with this new time-stamp. The adder then adds this updated time-stamp to the time-out value to determine a new sum that the comparator should compare the system time with to trigger the next expiration of the time-out timer 330.

Figure 6:
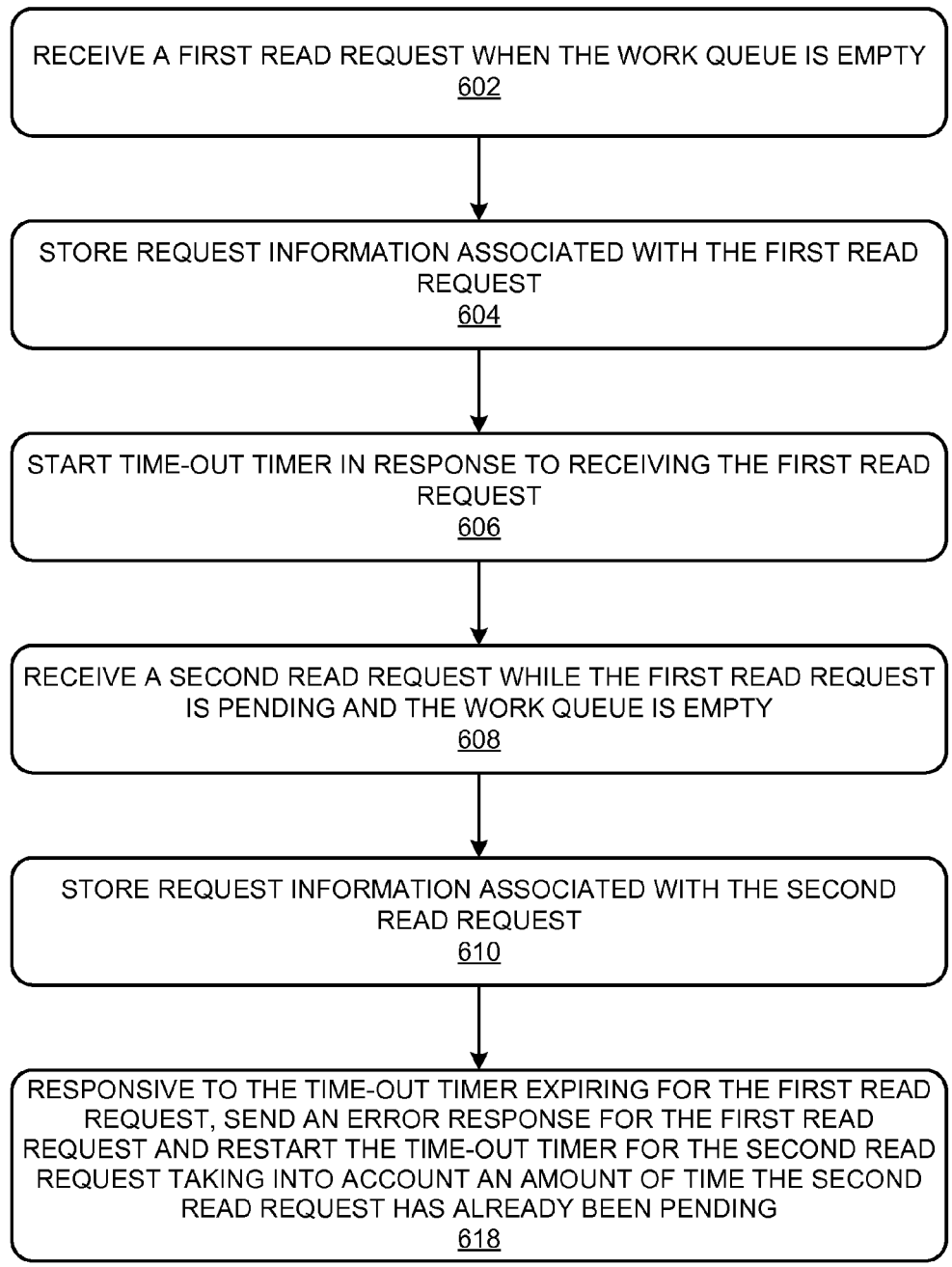
FIG. 6 illustrates a method for handling time-outs of read requests to a work queue in a work queue memory according to one embodiment of the invention.

FIG. 6 is a flow diagram illustrating a method in a multi-threaded processing system for minimizing resources for handling time-outs of read request to a work queue in a work queue memory that is configured in a blocking mode and being used by a threaded execution unit in the multithreaded processing system. The operations of the flow diagram will be described with reference to the exemplary embodiment of FIG. 5. However, it should be understood that the operations of the flow diagram can be performed by embodiments of the invention other than those discussed with reference to FIG. 5, and the embodiments discussed with reference to FIG. 5 can perform operations different than those discussed with reference to the flow diagram.

In step 602, a first read request to a work queue 360 configured in a blocking mode is received by the WQEE 300 when that work queue 360 is empty. In step 604, the WQEE 300 stores request information associated with the first read request in the status memory 320 corresponding to that work queue 360 in the WQEE 300. In step 606, a time-out timer 330 associated with that work queue 360 is started in response to receiving the first read request. In step 608, a second read request to the same work queue 360 is received by the WQEE 300 while the first read request is still pending and the work queue 360 is still empty. In step 610, the WQEE 300 stores request information associated with the second read request in the work queue memory 350. The request information associated with the second read request includes a time-stamp associated with the second read request when that second read request was received. In step 618, responsive to the time-out timer 330 expiring for the first read request, the WQEE 300 sends an error response for the first read request to the source of that first read request and restarts the time-out timer 330 for the time-out timer 330 for the second read request taking into account an amount of time the second read request has already been pending.

The time-out timer 330 is restarted in step 618 by fetching the request information associated with the second read request including the time stamp corresponding to that second read request from the work queue memory 350, and using the time stamp corresponding to that second read request to determine an amount of time to set for the time-out timer 330 for the second read request. In one embodiment, the time-out timer 330 includes a counter, and the time-out timer 330 is restarted for the second read request with a starting value being the result of subtracting the time-stamp corresponding to that second read request from a system time when the time-out timer 330 expires for the first read request. In an alternative embodiment, the time-out timer 330 is restarted for the second read request by setting the time-out timer 330 to expire when a system time reaches a sum of the time-stamp corresponding to that second read request and a time-out value.

Figure 7A:
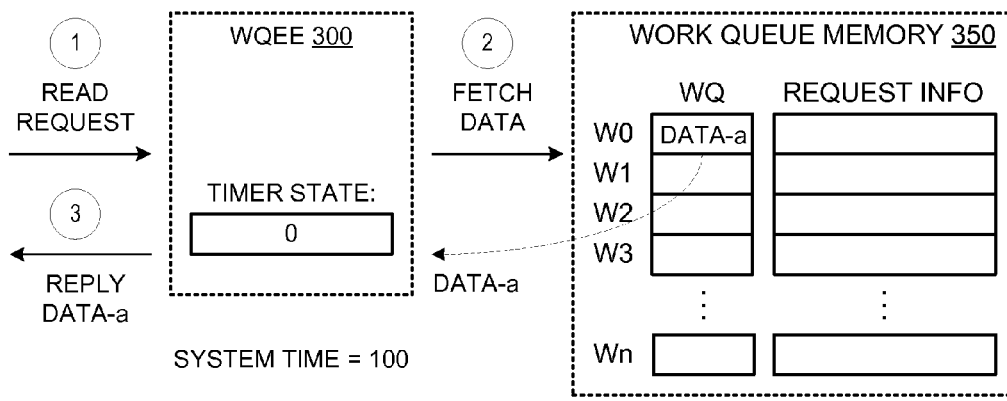
FIG. 7A illustrates the state of a work queue execution engine at various points in time according to one embodiment of the invention.
Figure 7B:
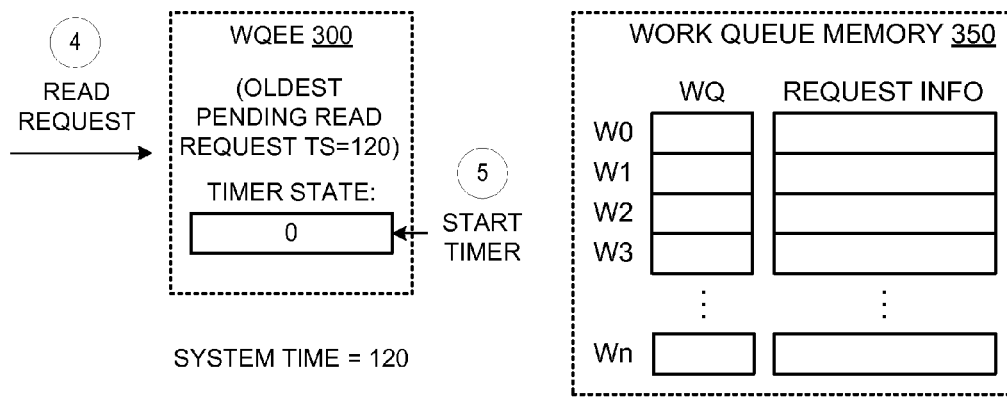
FIG. 7B illustrates the state of a work queue execution engine at other points in time according to one embodiment of the invention.

By way of example, FIG. 7A to FIG. 7J illustrates a series of read requests to one work queue configured in a blocking mode received by the WQEE 300 and the handling of those read requests by the WQEE 300 in accordance with one embodiment of the present invention. In this embodiment, the time-out timer 330 is implemented with a counter and a subtractor, and the counter is configured to expire when the count value reaches 20. The circles enclosing a number in the figures represent the chronological order of events. In FIG. 7A, a read request to the work queue in the work queue memory 350 is received by the WQEE 300 when the system time is 100 at event 1. When this read request was received, the work queue is filled with one data element "DATA-a" at the top of the work queue. Because the work queue is not empty at this time, the counter in the time-out timer 330 remains at 0 and is not started. At event 2, the WQEE 300 fetches the data from the work queue, and the WQEE 300 replies to the intended destination of the read request with the fetched data "DATA-a" at event 3. In FIG. 7B, another read request to the work queue is received by WQEE 300 at event 4 when the system time is 120. Because the work queue is empty at this time, the time-out timer 330 corresponding to this work queue is started at event 5. This read request is now the oldest pending read request with a time stamp of 120 for this work queue.

Figure 7C:
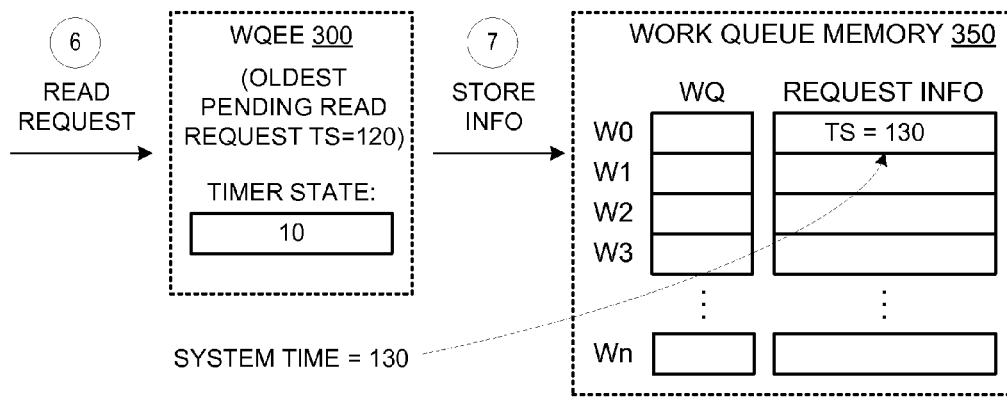
FIG. 7C illustrates the state of a work queue execution engine at another point in time according to one embodiment of the invention.
Figure 7D:
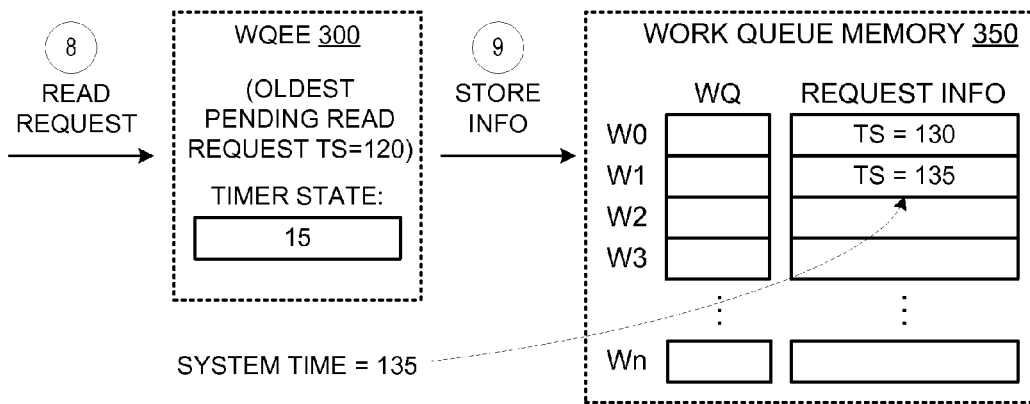
FIG. 7D illustrates the state of a work queue execution engine at different points in time according to one embodiment of the invention.

In FIG. 7C, another read request to this work queue is received at event 6 when the system time is 130. Hence, the time stamp corresponding to this read request is 130. The counter in the time-out timer 330 is at a count value of 10 at this time. Because the work queue is still empty, the read request information including the time stamp of 130 corresponding to this read request is stored in the work queue memory 350 at event 7 as shown. Referring now to FIG. 7D, an additional read request is received at event 8 when the system time is 135. At this time, the counter in the time-out timer 330 is at a count value of 15. The work queue remains empty at this time. Hence, at event 8, the time stamp of 135 corresponding to this additional read request is also stored in the work queue memory 350.

Figure 7E:
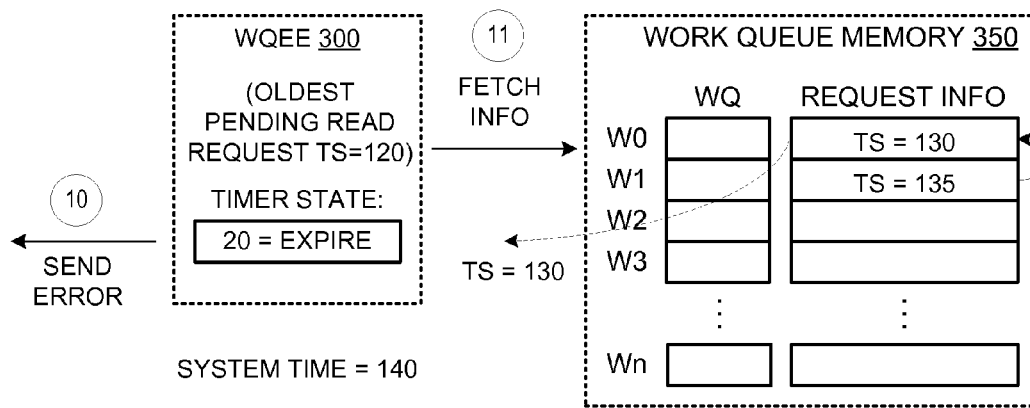
FIG. 7E illustrates the state of a work queue execution engine at further points in time according to one embodiment of the invention.
Figure 7F:
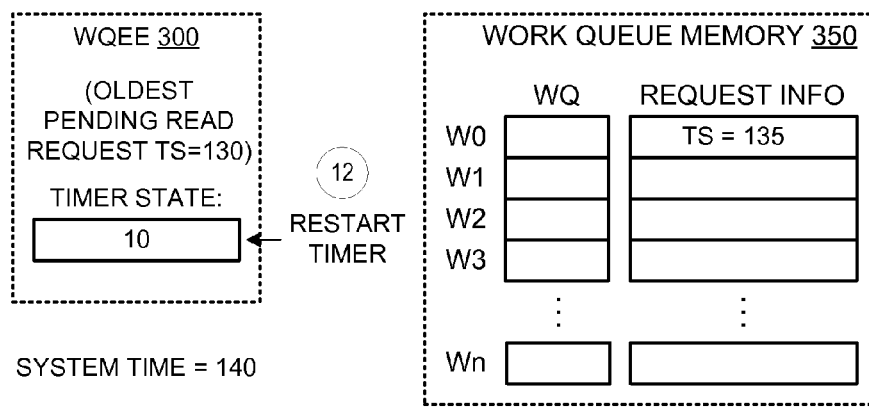
FIG. 7F illustrates the state of a work queue execution engine at yet other points in time according to one embodiment of the invention.

In FIG. 7E, the system time is at 140. At this time, the counter in the time-out timer 330 reaches a count value of 20 and expires. At event 10, an error response is sent to the source of the oldest pending read request having the time stamp of 120. At event 11, the read request information for the next one of the pending read requests is fetched from the work queue memory 350. The fetched information includes the time stamp of 130 that corresponds to the next one of the pending read requests. In FIG. 7F, the time-out timer 330 is restarted at event 12 with an initial value of 10, because the system time when the time-out timer 330 expired is 140, and subtracting the fetched time stamp of 130 from the system time of 140 yields the value 10. Note that the time stamp corresponding to the oldest pending read request is now 130, and the time stamp corresponding to the next one of the pending read requests is now 135.

Figure 7G:
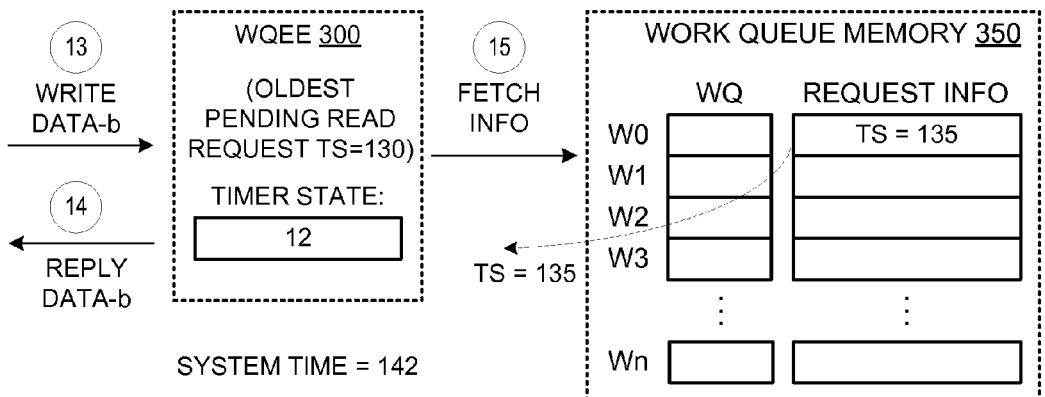
FIG. 7G illustrates the state of a work queue execution engine at yet another point in time according to one embodiment of the invention.
Figure 7H:
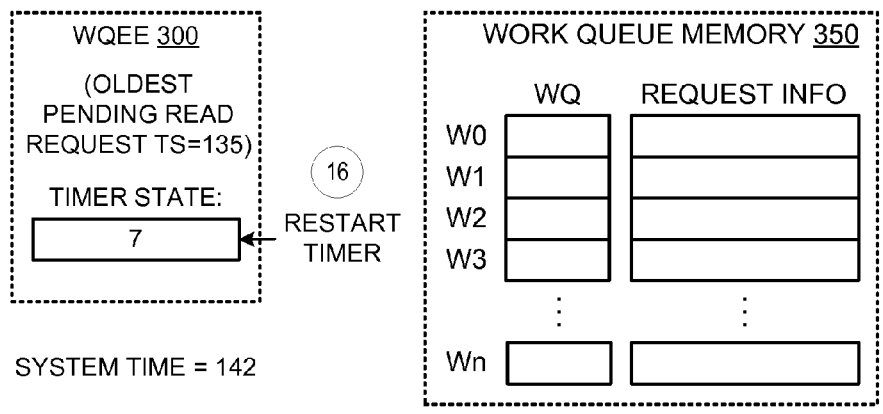
FIG. 7H illustrates the state of a work queue execution engine at yet different points in time according to one embodiment of the invention.
Figure 7J:
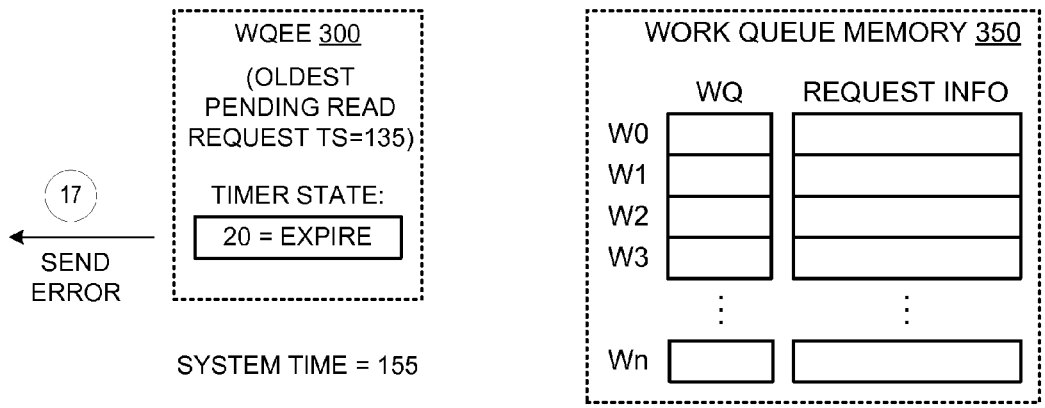
FIG. 7J illustrates the state of a work queue execution engine at yet further points in time according to one embodiment of the invention.

In FIG. 7G, the WQEE 300 receives a write to the work queue with the data element "DATA-b" when the system time is 142 at event 13. At this time, the counter in the time-out timer 330 is at a count value of 12. At event 14, the WQEE 300 replies to the intended destination of the current oldest pending read request having a time stamp of 130 with the write data "DATA-b." Note that it is not necessary for the WQEE 300 to write the data into the work queue because there is a pending read request waiting for this data. At event 15, the read request information for the next one of the pending read requests is fetched from the work queue memory 350. The fetched information includes the time stamp of 135 that corresponds to the next one of the pending read requests. In FIG. 7H, the time-out timer 330 is restarted at event 16 with an initial value of 7, because the system time when the reply is sent is 142, and subtracting the fetched time stamp of 135 from the system time of 142 yields the value 7. Note that the time stamp corresponding to the oldest pending read request is now 135, and there are no further pending read requests to this work queue. In FIG. 7J, the system time reaches 155 without any additional writes to the work queue. At this time, the counter in the time-out timer 330 reaches a count value of 20 and expires. At event 17, an error response is sent to the source of the oldest pending read request having the time stamp of 135.

Alternative Embodiments

While embodiments of the invention have been described in relation to network elements and network processors, the methods and apparatus described herein can be applied to other multithreaded systems, for example, any general purpose multithreaded processors and systems. Therefore, embodiments of the invention are not limited to network elements and network processors.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a multi-threaded processing system for minimizing resources for handling time-outs of read requests to a work queue in a work queue memory used by a threaded execution unit in the multi-threaded processing system, wherein the work queue is configured in a blocking mode, the method comprising the steps of:
   receiving, by a work queue execution engine module (WQEE), a first read request to the work queue when the work queue is empty;
   storing a first request information associated with the first read request in a status memory in the WQEE;
   starting a time-out timer in response to receiving the first read request;
   receiving, by the WQEE, a second read request to the work queue while the first read request is pending and the work queue is empty;
   storing a second request information associated with the second read request in the work queue memory; and
   responsive to the time-out timer expiring for the first read request while the first read request is pending, perform the steps of:
      sending an error response for the first read request; and
      restarting the time-out timer for the second read request taking into account an amount of time the second read request has already been pending.

2. The method of claim 1, wherein the step of storing the second request information associated with the second read request includes storing a time-stamp associated with the second read request.

3. The method of claim 2, wherein the step of restarting the time-out timer for the second read request comprises:
   fetching the second request information from the work queue memory; and
   using the time-stamp associated with the second read request to determine an amount of time to set for the time-out timer for the second read request.

4. The method of claim 3, wherein the time-out timer includes a counter, and wherein the step of restarting the time-out timer for the second read request includes restarting the counter with a starting value being the result of subtracting the time-stamp from a system time when the time-out timer expires for the first read request.

5. The method of claim 3, wherein the step of restarting the time-out timer for the second read request includes setting the time-out timer to expire when a system time reaches a sum of the time-stamp and a time-out value.

6. The method of claim 1, wherein the work queue memory is implemented with on-chip embedded DRAM (eDRAM).

7. The method of claim 1, wherein the work queue memory is implemented with off-chip external memory.

8. A multithreaded network processor configured to minimize resources required to handle time-outs of read requests to work queues, the multithreaded network processor comprising:
   a plurality of threaded execution cluster modules (TECs) each comprising a plurality of threaded execution units (TEUs) to execute processing threads in the network processor;
   an on-chip network (OCN) switch module coupled to the plurality of TECs to manage communication for the plurality of TEUs; and
   a plurality of work queue execution engine modules (WQEEs) coupled to the plurality of TEUs for managing read and write accesses from the plurality of TEUs to a plurality of work queue groups, wherein each one of the WQEEs is coupled to one of the work queue groups in a work queue memory, and each one of the WQEEs comprises:
      only one time-out timer, for each work queue in the corresponding work queue group, to generate time-outs of pending read requests to the corresponding work queue when the time-out timer expires and when the read requests arrive and their corresponding work queue is empty;
      a status memory to store, for each work queue in the corresponding work queue group, request information associated with an oldest one of the pending read requests to the corresponding work queue; and
      a work queue interface logic block to perform the read and write accesses to the corresponding work queue group, and, responsive to the time-out timer expiring for the oldest one of the pending read requests, to send an error response for the oldest one of the pending read requests and to restart the time-out timer for a next one of the pending read requests taking into account an amount of time that next one of the pending read requests has already been pending.

9. The multithreaded network processor of claim 8, wherein the request information associated with each of the other pending read requests are stored in the work queue memory.

10. The multithreaded network processor of claim 9, wherein the work queue interface logic block, to restart the time-out timer for a next one of the pending read requests, is to:
   fetch the request information associated with the next one of the pending read requests from the work queue memory.

11. The multithreaded network processor of claim 10, wherein the request information associated with the next one of the pending read requests includes a time-stamp corresponding to the next one of the pending read requests.

12. The multithreaded network processor of claim 11, wherein the time-out timer is restarted using the time-stamp corresponding to the next one of the pending read requests to determine an amount of time to set the time-out timer.

13. The multithreaded network processor of claim 12, wherein the time-out timer includes a counter, and wherein the time-out timer is configured to expire when the counter reaches a time-out value, and the counter is restarted with a starting value being the result of subtracting the time-stamp from a system time when the time-out timer expires for the oldest one of the pending read requests.

14. The multithreaded network processor of claim 12, wherein the time-out timer is configured to expire when a system time reaches a sum of the time-stamp stored in the status memory and a time-out value.

15. The multithreaded network processor of claim 8, wherein each one of the TECs further comprises a cluster switch block (CSB) execution switch module coupled to the plurality of TEUs to distribute workload among the TEUs, wherein the CSB execution switch module includes one of the WQEE, and the work queue group coupled to the WQEE in the CSB execution switch module is implemented with on-chip embedded DRAM (eDRAM).

16. The multithreaded network processor of claim 8, wherein the OCN switch module is coupled to a plurality of memory controllers (MCTs) to interface with off-chip external memory, wherein each one of the MCTs includes one of the WQEE, and the work queue group coupled to the WQEE in the MCT is implemented with the off-chip external memory.

17. A line card in a network element for interfacing with an external network, the line card comprising:
   at least one multithreaded network processor configured to minimize resources required to handle time-outs of read requests to work queues, the multithreaded network processor comprising:

a plurality of threaded execution cluster modules (TECs) each comprising a plurality of threaded execution unit modules (TEUs) to execute processing threads in the network processor;
an on-chip network (OCN) switch module coupled to the plurality of TECs to manage communication for the plurality of TEUs; and
a plurality of work queue execution engine modules (WQEEs) coupled to the plurality of TEUs for managing read and write accesses from the plurality of TEUs to a plurality of work queue groups, wherein each one of the WQEEs is coupled to one of the work queue groups in a work queue memory, and each one of the WQEEs comprises:
  only one time-out timer, for each work queue in the corresponding work queue group, to generate time-outs of pending read requests to the corresponding work queue when the time-out timer expires and when the read requests arrive and their corresponding work queue is empty;
  a status memory to store, for each work queue in the corresponding work queue group, request information associated with an oldest one of the pending read requests to the corresponding work queue; and
  a work queue interface logic block to perform the read and write accesses to the corresponding work queue group, and, responsive to the time-out timer expiring for the oldest one of the pending read requests, to send an error response for the oldest one of the pending read requests and to restart the time-out timer for a next one of the pending read requests taking into account an amount of time that next one of the pending read requests has already been pending.

18. The line card of claim 17, wherein the request information associated with each of the other pending read requests are stored in the work queue memory.

19. The line card of claim 18, wherein each one of the TECs in the multithreaded network processor further comprises a cluster switch block (CSB) coupled to the plurality of TEUs to distribute workload among the TEUs, wherein the CSB includes one of the WQEE, and the work queue group coupled to the WQEE in the CSB is implemented with on-chip embedded DRAM (eDRAM).

20. The line card of claim 19, wherein the OCN switch module in the multithreaded network processor is coupled to a plurality of memory controllers (MCTs) to interface with off-chip external memory, wherein each one of the MCTs includes one of the WQEE, and the work queue group coupled to the WQEE in the MCT is implemented with the off-chip external memory.

* * * * *